Jan. 21, 1969  N. E. FARB ET AL  3,422,567

AUTOMATIC LANDING GEAR FOR A MODEL AIRCRAFT

Filed Oct. 18, 1965

NORMAN E. FARB
NORMAN D. HARRIS
INVENTORS.

BY John A. Duffy

ATTORNEY.

United States Patent Office 3,422,567
Patented Jan. 21, 1969

1

3,422,567
AUTOMATIC LANDING GEAR FOR A
MODEL AIRCRAFT
Norman E. Farb, 2106 Denis Ave., and Norman D.
Harris, 2545 E. Walnut Ave., both of Orange,
Calif. 92667
Filed Oct. 18, 1965, Ser. No. 497,265
U.S. Cl. 46—77                                3 Claims
Int. Cl. A63h 27/04

ABSTRACT OF THE DISCLOSURE

A landing gear assembly for a guided model aircraft which includes a pair of wheels which are joined by pulley means which cause movement of one of the wheels in a vertical plane by similar movement of the other wheel. The weight is responsive to centrifugal force exerted when the aircraft is in flight causing the arm to rotate about the axis of the pulley and in turn rotating the pulley.

---

This invention relates to model aircraft and more particularly to wire guided model aircraft having automatically retractable landing gear.

Wire guided model aircraft are well known and increasingly popular. The continuing efforts towards sophistication in design have created a need for more and more features which exist in the real airplanes. A desirable feature would be retractable landing gear for much the same reasons that exist in actual aircraft. A smoother, more reliable and efficient flight could be realized in addition to the better design and ornamental features.

Previous attempts to incorporate rectractable landing gear in model aircraft have not been successful due to the inability of the designers to produce a simple and reliable structure. To provide automatic retractable landing gear the designers have had to provide some kind of a power source to operate mechanisms which in turn retract the landing gear. Such systems were costly, inefficient and unreliable. Accordingly it is an object of this invention to provide an improved automatic landing gear assembly for a model aircraft.

The device of this invention provides a simple and reliable means for automatically retracting landing gear in a wire guided model aircraft without the use of a special power source. The entire power needed is in effect provided by the operation of the aircraft itself without any interference with the operating characteristics of the aircraft. By simply utilizing existing centrifugal force applied to a simple mechanism incorporated in the aircraft a completely automatic system is realized which causes the landing gear to retract when the aircraft is in flight and returns the gear to the landing position when the aircraft slows down. A simple system with few parts provides an inexpensive way of essentially duplicating the automatic landing gear features of a big aircraft in a model aircraft.

It is therefore another object of this invention to provide an automatic landing gear system without the addition of a special power source.

It is another object of this invention to provide an automatic landing gear system utilizing existing forces acting on the aircraft to provide the source of power for the landing gear system.

It is a further object of this invention to provide an automatic landing system in a wire guided model aircraft utilizing the existing centrifugal force on the aircraft to provide the means for moving the landing gear.

It is still another object of this invention to provide an automatic landing gear system in a wire guided model aircraft in which the wheels are automatically locked in place when the aircraft touches ground.

2

Figure 1:
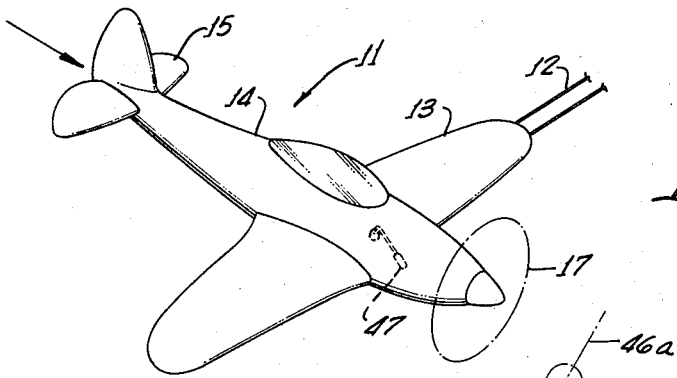
Figure 2:
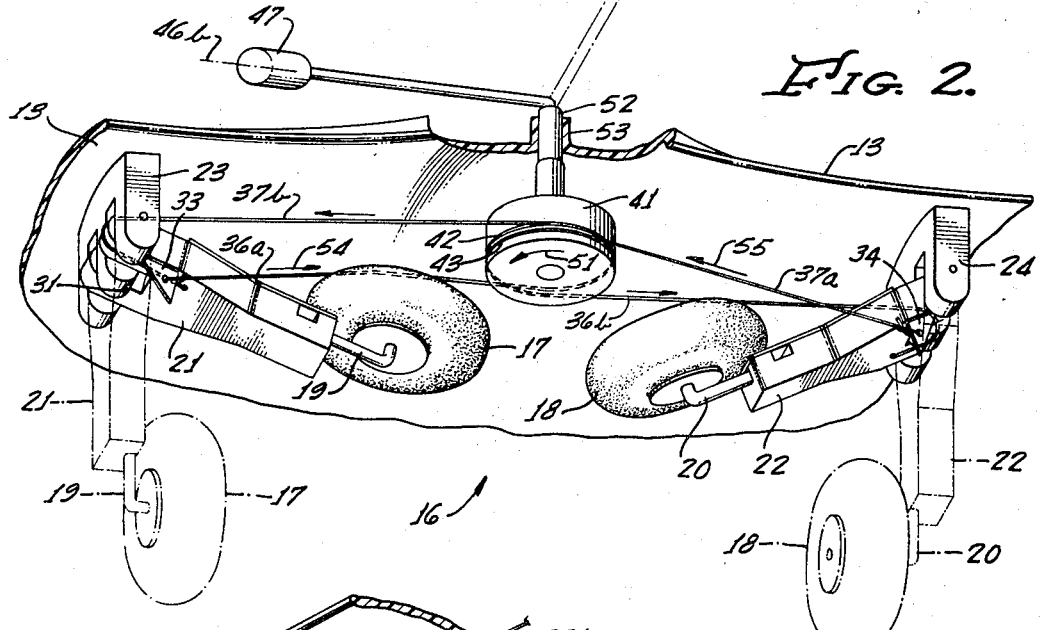
Figure 3:
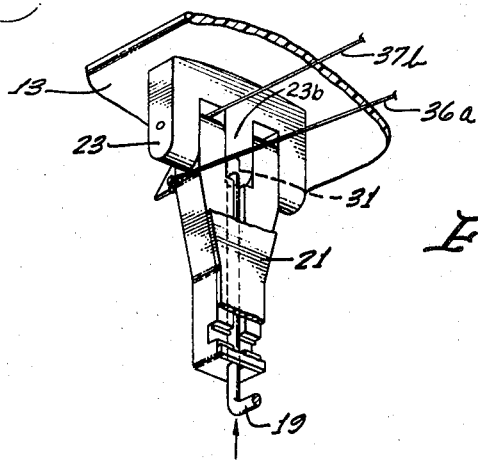

Other objects of the invention will become apparent from the following description read in conjunction with the accompanying drawings in which:

FIGURE 1 is a view in perspective of a model aircraft according to one aspect of the invention illustrating a wire guided aircraft, FIGURE 2 is a blown up view of the landing gear system utilized in the aircraft of FIG. 1 illustrating the automatic landing system according to the invention, and FIGURE 3 is a view of one of the struts of the landing gear assembly of FIG. 2 showing the locking feature when the aircraft touches down.

According to a principal aspect of the invention a wire guided model aircraft has a landing gear assembly mounted on the underside of the fuselage. The assembly includes a pair of wheels which are joined by pulley means which cause movement of one of said wheels in a vertical plane by similar movement of the other. Movement of the pulley causes the wheels to move from a landing position to a retracted position. The pulley means are in turn caused to rotate by a mechanism which includes a weight mounted at the end of an arm attached to the pulley. The weight is responsive to centrifugal force exerted when the aircraft is in flight causing the arm to rotate about the axis of the pulley means and in turn rotating the pulley. In this manner the landing gear assembly is moved from a landing position to a retracted position by the use of centrifugal force.

According to a further aspect of the device of this invention means are provided in the landing gear assembly to lock the wheels in an extended position when the aircraft touches down.

Referring now to the drawing and in particular to FIGURES 1 to 3 inclusive, there is disclosed an aircraft generally identified by the numeral 11. The aircraft 11 is of the type known as a model airplane and is designed to be guided from the ground by wires 12 attached in a conventional manner to one edge of the wings 13. The aircraft 11 may be of any suitable well known model aircraft design having a fuselage 14 formed integrally with a tail section 15, wings 13, and engine driven propeller 17.

Fixedly secured to the fuselage 14 and mounted on the underside thereof is a landing gear assembly 16. The assembly 16 comprises a pair of wheels 17 and 18 disposed at opposite lateral sides of the fuselage 14. Each of the wheels is adapted for rotation about wheel supporting pins 19 and 20, which are L shaped to have a horizontal portion extending through the axles of the wheels 17 and 18 and a vertical portion extending upward. Each of the pins 19 and 20 has its vertical portion extending through corresponding holes provided by supporting struts 21 and 22 which, in turn, are pivotally connected to base supports 23 and 24 respectively. The base supports 23 and 24 may be E shaped having center recessions for receiving the upper ends of the struts 21 and 22 which are fork shaped to fit in the recessions of the base supports 23 and 24.

Each of the base supports has a slot in its center portion as may readily be seen in FIG. 3 where the support 23 has its center portion 23b fitted with a slot 31 which extends in the same direction as the pins 19 and 20 when the landing gear assembly 16 is in the extended or landing position as illustrated in FIG. 3.

The landing gear assembly 16 is retractable as may be seen in FIG. 2 having a retracted position and an extended position. In the retracted position the pins 19 and 20 do not extend into the slots of the base supports 23 and 24 with the length of the verical portions of the pins 19 and 20 being such that the upper ends of the portions are free of the slots. However in the projected position as shown in FIG. 3, as well as FIG. 2, wherein the wheels 17 and 18 are touching ground, the weight of the aircraft 11 forces the pins 19 and 20 into the respective slots of the supports 23 and 24 thereby locking the wheels 17 and 18 in the landing position providing a rigid support for the aircraft 11 when it lands. Thus slots are in full engagement with the pins 19 and 20 when the wheels are on the ground.

The mechanism for causing movement of the landing gear assembly between a retracted position during flight and an extended position during landing is particularly illustrated in FIG. 2 wherein each of the struts 21 and 22 has a protruding flange support, 33 and 34 respectively, which has one end of a cable attached thereto. Each of the cables extends inwardly from the struts 21 and 22 and is wound around a track of a reel or pulley 41 and then extends outwardly from the reel 41 to be fixedly attached to the upper portion of each of the struts 21 and 22. Thus cable 36 has one end attached to the support 33 on the strut 21 and is wound around the upper and lower tracks 42 and 43 of the reel 41 to extend outwardly from the reel 41 and then attached to the upper portion of the strut 22. Similarly the cable 37 has one end attached to the support 34 on the strut 22 and is wound around the reel 41 and is fixedly attached to the upper portion of the strut 21.

The reel 41 is pivotally attached to the underside of the fuselage 14 at a centrally located portion thereof by a hub 52 which extends through a suitable boss 53 of the fuselage 14. The hub 52 is integrally joined to an L shaped arm 46 which extends horizontally a predetermined distance being capped at the end with a weighted portion 47.

The weighted portion 47 is responsive to centrifugal force generated when the aircraft 13 is in flight moving from the initial position 46a to the position 46b. The centrifugal force acting on the weight 47 moves the arm 46 correspondingly which in turn causes rotation of the hub 52 and attached reel 41. Rotation of the reel 41, in the direction shown by the arrow, causes the cables 36 and 37 to wind around the tracks of the reel 41 to create tension on the legs 36a and 37a in the direction shown by arrows 54 and 55, respectively. Cable 37 acts to pull wheel 18 from its extended position to its retracted position and cable 36 acts to pull wheel 17 toward its retracted position. In this manner centrifugal force acting on the weight 47 causes the landing gear assembly 16 to move to a retracted position when the aircraft is in flight. Upon slowing down for landing the weight of the landing gear overcomes the centrifugal force. This causes movement of the reel 41 back towards its original position with the cables 36 and 37 acting to return the wheels 17 and 18 to the full extended or landing position. As the airplane decelerates in its vertical velocity prior to the landing the wheels 17 and 18 reach the full landing position.

In addition to the force acting through the reel 41 on the wheels 17 and 18, the wheel 18, which is itself subjected to a centrifugal force as it pivots in the base support 24, exerts a force on the wheel 17 through the cables 36 and 37 tending to cause the wheel 17 to go to its retracted position during flight. The force exerted by the wheel 18 thereby counteracts any centrifugal force exerted against the wheel 17 tending to inhibit the wheel 17 from going to its retracted position.

From the above description it is readily apparent that the landing gear assembly 16 is automatically retractable during flight of the aircraft 11. The entire force necessary to move the assembly 16 from its extended position to its retracted position and back again is generated by the centrifugal force arising from the operation of the aircraft 11.

It is to be realized that, while the embodiment illustrated shows the aircraft 11 being guided by wires 12 on the port side, the aircraft 11 could just as well be guided on the starboard side with minor modifications to the structure which would be readily apparent to those skilled in the art.

The advantages inherent in the simple structure illustrated which uses the existing centrifugal force to move the aircraft landing gear, include lower cost, greater reliability, simplicity of design, and the like.

While the invention has been disclosed herein with respect to the embodiments illustrated in the drawing, it will be readily apparent that numerous variations may be made within the scope of the invention. For example, the weight responsive to centrifugal force may be placed anywhere in the aircraft that is desired.

We claim:
1. An automatic landing system for a wire guided aircraft comprising,
 a pair of wheel supporting legs,
 a strut for each said leg,
 a pair of base supports mounted to the underside of the fuselage of said aircraft,
 means for pivotally mounting said struts to said base supports,
 a pulley pivotally mounted to the underside of the fuselage of said aircraft,
 an arm having a vertical portion attached to the axle of said pulley and having a horizontally extending portion,
 a weight attached to the end of said horizontally extending portion responsive to centrifugal force,
 and cable means connecting said pulley to said struts whereby movement of said weight causes movement of said cable means.
2. The automatic landing system recited in claim 1 wherein said cable means comprises a pair of cables,
 each of said cables having one end rigidly attached to a corresponding strut and having the other end wound around said pulley and attached to the other strut,
 whereby rotation of said pulley creates tension on said cables causing said struts to pivot.
3. The automatic landing system recited in claim 1 wherein each of said base supports has a slot,
 each of said slots being in full engagement with a corresponding wheel supporting leg when said aircraft is in a landing position,
 and each said slot being disengaged from said legs when said aircraft is in a flight condition.

References Cited

UNITED STATES PATENTS 2,584,588  2/1952  Hyatt _____ 46—77
2,616,214  11/1952  Hydrick _____ 46—77

LOUIS G. MANCENE, Primary Examiner.

C. R. WENTZEL, Assistant Examiner.